(12) United States Patent
Kelman et al.

(10) Patent No.: US 11,089,384 B2
(45) Date of Patent: Aug. 10, 2021

(54) APPARATUS AND METHOD FOR PROTECTING THE PRIVACY OF VIEWERS OF COMMERCIAL TELEVISION

(71) Applicants: Alistair Bruce Kelman, London (GB); Diana Elizabeth Kelman, London (GB)

(72) Inventors: Alistair Bruce Kelman, London (GB); Diana Elizabeth Kelman, London (GB)

(*) Notice: Subject to any disclaimer, the term of this patent is extended or adjusted under 35 U.S.C. 154(b) by 0 days.

(21) Appl. No.: 16/652,411

(22) PCT Filed: Sep. 20, 2018

(86) PCT No.: PCT/GB2018/052681
§ 371 (c)(1),
(2) Date: Mar. 30, 2020

(87) PCT Pub. No.: WO2019/077297
PCT Pub. Date: Apr. 25, 2019

(65) Prior Publication Data
US 2020/0288213 A1     Sep. 10, 2020

(30) Foreign Application Priority Data
Oct. 21, 2017  (GB) ...................... 1717332

(51) Int. Cl.
*H04N 21/81* (2011.01)
*G06F 21/78* (2013.01)
(Continued)

(52) U.S. Cl.
CPC .......... *H04N 21/812* (2013.01); *G06F 21/78* (2013.01); *G06N 7/005* (2013.01);
(Continued)

(58) Field of Classification Search
None
See application file for complete search history.

(56) References Cited

U.S. PATENT DOCUMENTS

2007/0242824 A1* 10/2007 Vishik ............... H04N 21/4532
                                                                    380/200
2011/0185384 A1*  7/2011 Wang ................ G06Q 30/0255
                                                                    725/34
(Continued)

FOREIGN PATENT DOCUMENTS

GB         2464630 A      4/2010
GB         2490802 A      11/2012
(Continued)

OTHER PUBLICATIONS

PCT International Patent Application No. PCT/GB2018/052681, International Search Report dated Dec. 14, 2018, 3 pp.
(Continued)

*Primary Examiner* — Michael H Hong
(74) *Attorney, Agent, or Firm* — Phillips Winchester

(57) ABSTRACT

A mobile telephone or tablet or the like (40) for viewing commercial television programmes has a display screen (41), a firewall (70), and behind the firewall a first, sealed data storage section (42) which stores personal attributes of a viewer, such as a child, supplied on a token (32) from a trusted third party (10), a second, unsealed data storage section (44) to which the personal attributes are copied, the second section having a flag (48) which is set when the data in the second section has been modified by the viewer, and a third data storage section (46) in which personal preferences can be stored by the viewer. Adverts from advertisers (50) targeted on the data in the second and third sections are sent to the device (40), headers in the adverts are checked against the data in the first section, and adverts are rejected if they are unsuitable for the viewer. Unrejected adverts are (Continued)

shown on the display screen, and the advertiser is informed of their showing, but the identity of the viewer is not disclosed.

10 Claims, 6 Drawing Sheets

(51) Int. Cl.

| | |
|---|---|
| *G06N 7/00* | (2006.01) |
| *G06Q 30/02* | (2012.01) |
| *G06Q 50/26* | (2012.01) |
| *H04N 21/2347* | (2011.01) |
| *H04N 21/414* | (2011.01) |
| *H04N 21/45* | (2011.01) |
| *H04N 21/466* | (2011.01) |
| *H04N 21/658* | (2011.01) |
| *H04L 29/06* | (2006.01) |

(52) U.S. Cl.
CPC ..... *G06Q 30/0248* (2013.01); *G06Q 30/0267* (2013.01); *G06Q 30/0269* (2013.01); *G06Q 50/265* (2013.01); *H04N 21/2347* (2013.01); *H04N 21/41407* (2013.01); *H04N 21/4532* (2013.01); *H04N 21/4663* (2013.01); *H04N 21/6582* (2013.01); *G06F 2221/2115* (2013.01); *H04L 63/02* (2013.01)

(56) References Cited

U.S. PATENT DOCUMENTS

| | | | |
|---|---|---|---|
| 2012/0084151 A1* | 4/2012 | Kozak | .................. G06Q 30/02 |
| | | | 705/14.58 |
| 2017/0264591 A1* | 9/2017 | Roberts | ............... G06F 21/6263 |

FOREIGN PATENT DOCUMENTS

| | | |
|---|---|---|
| GB | 2553247 A | 2/2018 |
| WO | 2003053056 A1 | 6/2003 |
| WO | 2011083337 A1 | 7/2011 |
| WO | 2013048426 A1 | 4/2013 |
| WO | 2015048338 A1 | 4/2015 |
| WO | 2019077297 A1 | 4/2019 |

OTHER PUBLICATIONS

PCT International Patent Application No. PCT/GB2018/052681, Written Opinion dated Dec. 14, 2018, 5 pp.
GB Patent Application No. 1717332.9, Combined Search and Examination Report dated Dec. 17, 2017, 6 pp.
GB Patent Application No. 1717332.9, Examination Report dated Apr. 27, 2018, 3 pp.

* cited by examiner

APPARATUS AND METHOD FOR PROTECTING THE PRIVACY OF VIEWERS OF COMMERCIAL TELEVISION

CROSS-REFERENCE TO RELATED APPLICATIONS

This application is a national phase entry under 35 U.S.C. § 371 of International Patent Application PCT/GB2018/052681, filed Sep. 20, 2018, designating the United States of America and published in English as International Patent Publication WO 2019/077297 on Apr. 25, 2019 for "Apparatus and Method for Protecting the Privacy of Viewers of Commercial Television," which claims priority to GB Patent Application 1717332.9, filed Oct. 21, 2017 for "Apparatus and Method for Protecting the Privacy of Viewers of Commercial Television," the disclosure of each of which is hereby incorporated herein in its entirety by this reference.

TECHNICAL FIELD

Embodiments of the disclosure relate to the protection of privacy of viewers of television and internet services which are supported by targeted advertising.

In this digital age, two of the many issues are privacy of individuals, and proof of identity. Embodiments of the disclosure are related to both areas.

One proof of identity system which operates in the UK is PASS, Proof of Age Standards Scheme, in which a card carrying a PASS hologram is issued to young persons as proof of age. The providers of the cards have been through a stringent application and accreditation process, so, for example, point of sale retailers know that such a card can be relied upon. However, the holder's personal details are made available even when only age is relevant, so there is not full privacy.

In the field of commercial television, in the UK and many other countries, there are regulations to ensure that broadcasters and advertisers do not infringe the privacy rights of viewers, and that children and other vulnerable people are protected. In the USA, the Children s Online Privacy Protection Act of 1998 imposes requirements on operators of websites or online services directed to children.

In at least the UK and the European Union, there is also concern that fraud in, for example, pensions and benefits systems, causes problems; payments may be made to people who have died or never existed. A recent technical development allows an official authorizing body to issue approved digital tokens based on public records which provide 'proof of life' and record attributes such as sex, age, location, physical characteristics etc. A problem then arises that use of such a token for a commercial digital transaction may reveal more data than is necessary, as with PASS, so a mechanism is needed to reveal only relevant data.

With the wide use of social media systems by the public, an alternative means of verification of identity can be provided. In the USA, the National Institute of Standards and Technology in Special Publication 800-63-3 provides guidelines on implementation of digital identity services. Varying levels of accuracy are permitted, for example to a 'balance of probability_proof of a characteristic, such as age, when this is acceptable.

BACKGROUND

In GB 2464630, IncenTV Ltd, privacy of a viewer of television adverts is protected by storing viewer characteristics in the television set behind a firewall, creating pseudo identities, and targeting adverts at viewers at an accuracy deliberately less than 100% by use of Bayes Theorem.

In GB 2490802, Kelman, each viewer can create a personal profile which is stored behind a firewall in, for example, a personal video recorder, and only adverts having headers which match the profile are shown—the headers indicate the nature of the advert, as is conventional. Once shown, a signal is sent to a broadcaster indicating that this advert has been shown to a viewer having targeted characteristics, but the viewers identity is protected. A feature is that the viewer can create a profile which is not true. For example, the viewer may give an incorrect postcode (zip code) and the system merely checks that it is a valid postcode, not that it is correct. The viewer may choose to include an incorrect age, in which case adverts targeted at that age group will be shown to that viewer. It is believed that this control over the recorded profile engenders greater trust between the viewer and the advertiser.

However, the question then arises that advertisers may think that adverts targeted to a false profile are a waste of budget.

SUMMARY

According to embodiments of the disclosure, a digital device for viewing free-to-air videos with targeted advertising comprising;
means to receive videos;
means to receive and store targeted advertisements having associated headers which indicate the nature of the advert;
visual display means;
a firewall;
and behind the firewall data storage means having
  a first, sealed data storage section for storing personal attributes of the viewer provided by a trusted authority;
  a second, unsealed data storage section to which the data in the first sealed section can be copied and in which that copied data can be modified by the viewer;
  a third, preference data storage section in which the viewer can store data of his choice; and
  in the second section flag means to indicate whether the data in it has been modified;
arranged to that a stored targeted advert is not supplied to the visual display unit when a personal attribute in the first, sealed data storage section indicates that the viewer is not an appropriate recipient for that advert.

Preferably the first, sealed section is populated by means of an encrypted token from a trusted third party.

The digital device may be arranged to receive and store commercial television for time-shifted viewing, or alternatively may store adverts for showing on the device during commercial breaks in live commercial television programs.

Optionally the digital device is a mobile telephone or a tablet.

BRIEF DESCRIPTION OF THE DRAWINGS

Embodiments of the disclosure will be described by way of example with reference to the accompanying drawings in which.

DETAILED DESCRIPTION

Embodiments of the disclosure utilize data from a central registry, populated by an appropriate authority, which records data relating to, for example, a child who is intending to use commercial television supplied over a broadband connection such as WiFi® or mobile internet. Two arrangements for providing such a registry are described below.

Figure 1:
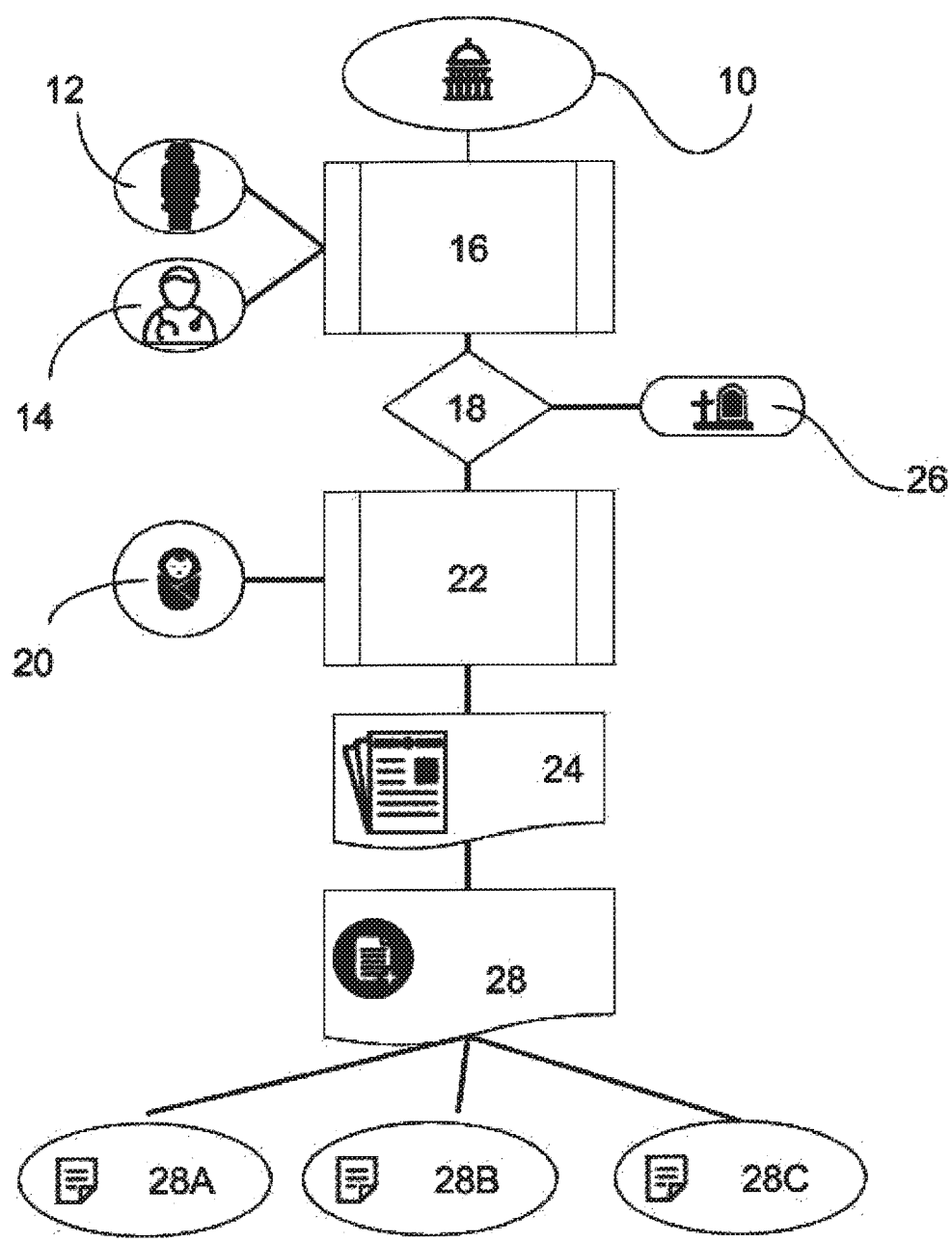
FIG. 1 shows a system for the registration of the birth of a child and the process of the creation of attributes associated with a specific child.

In FIG. 1, a Government or Local Authority establishes a General Registry 10 for the digital registration of births. A new parent 12 and/or medical authority 14 provides information to the General Registry 10 which 25 creates a birth record 16 of a child, containing at least date of birth, sex and, for example, weight, such a system already exists in many countries, but must be extended for application to the embodiments of the disclosure.

After a predetermined number of years 18, for example four years, the data record for a child 20 is updated by its parent 12 providing information which may include attributes such as home address, fingerprints, DNA data, retinal scan etc. to the General Registry 10 for processing at 22 and a child ID record 24 is recorded from the supplied attributes. The child ID record 24 is a complete identity record and can be updated at any time. If the child does not live for this period, the record terminates, 26.

From the child ID Record 24, the General Registry 10 creates a series of attribute records 28 each of which records one selected attribute of the child, shown as 28A, 28B, 28C. For example, attribute 28A may be age, attribute 28B may be sex and attribute 28C may be postcode/zip code.

If the Government or Local Authority is unwilling/unable to establish a General Registry, an alternative system could be set up by, for example, a school, which could be referred to as a Special Registry. This will hold a digital database of biometric characteristics (attributes) of pupils, and will receive from a parent permission to record physical characteristics of a pupil, such as date and place of birth, the parent providing proof of residence such as a utility bill.

In association with a school executive, the Special Registry creates a pupil ID record, which in addition to sex, age and home location may also include a digital photograph, ethnicity, authority responsible for the pupils education and the like attributes.

From the pupil ID record, the Special Registry creates a series of attribute records each of which records one attribute of the child, as described with reference to FIG. 1.

For the purposes of the embodiments of the disclosure, either arrangement can be used to set up a Registry 10; data from such a Registry can then be accessed for use when implementing the embodiments of the disclosure.

Figure 2:
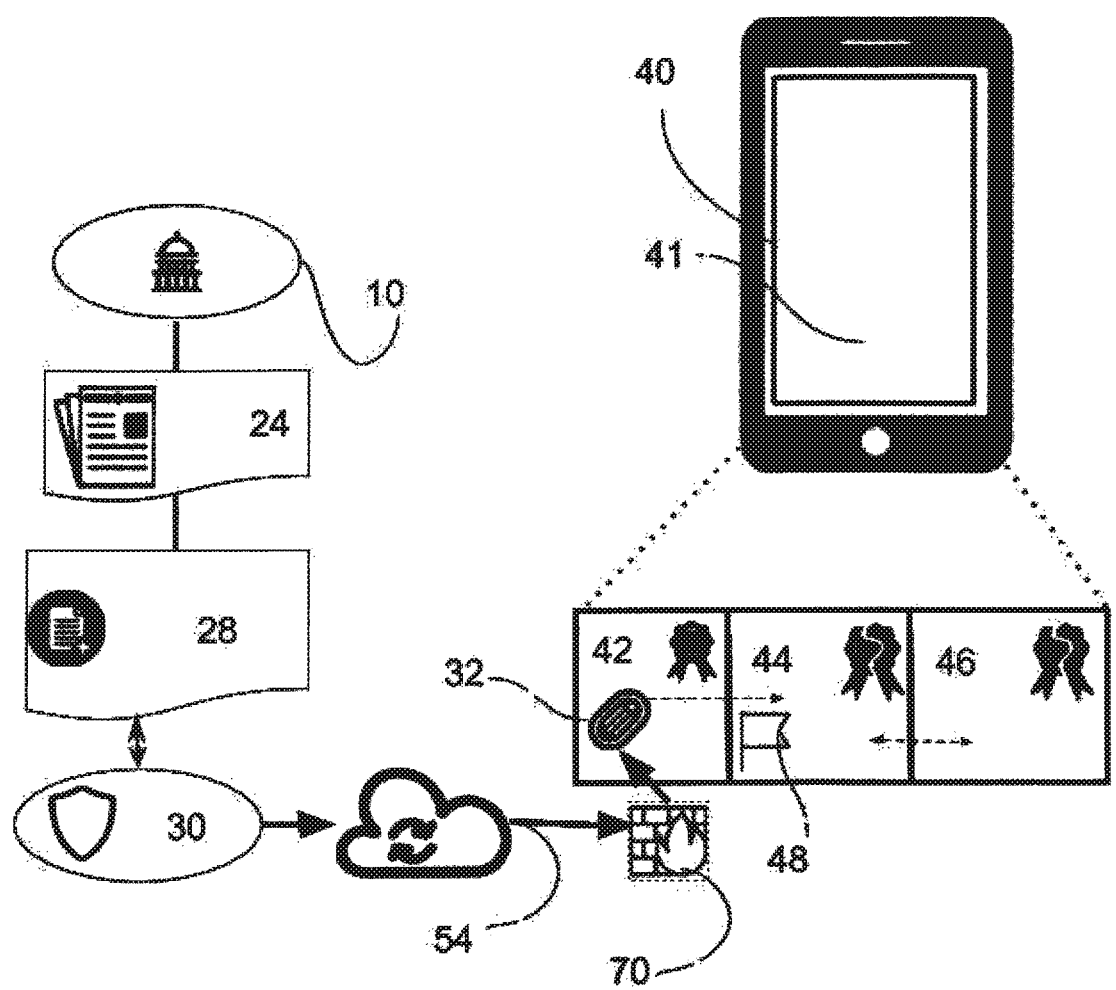
FIG. 2 is a schematic showing a trusted third party using the attributes of the child to create a token to enable the verification of attributes on a mobile device that is to be used by a specific child.

In FIG. 2, a trusted third party 30, which is a technology service provider (i.e. a technology company like IBM®, Google®, Apple®, Microsoft®, etc.) requests a copy of the attribute records 28, or a relevant selection of attributes, from the registry 10 and from them creates an anonymized token 32 which includes the selected attributes 28. In the preferred implementation the token 32 will be a cryptographically generated Zero Knowledge Proof of the attributes of the child. Commercial services to generate tokens of this kind are available, for example 'Identity Mixer from IBM® or Zero-Knowledge Authentication from Sedicii.

Such a token 32 may be used in for example a tablet or smart phone or other electronic device 40 capable of being used to view catch-up commercial television on a screen 41, when a child must be protected from viewing unsuitable adverts. The device 40 is provided with storage means divided into three areas: a first, sealed zone 42 which cannot be altered by the child; a second, unsealed zone 44 which can be altered by the child; the third, preference zone 46 can be used by the child to store data at will, such as topics of interest and responses to socio-demographic questions (e.g. 'Is your first language English?). The second, unsealed zone 44 has a flag 48 which indicates if the data in that zone has been altered.

When a device 40 is to be given to a child, it is prepared in advance by the trusted third party 30 creating the relevant token 32 with attributes of that child, uploading it via the Internet 54 and through a firewall 70 in the device 40, and storing it in the sealed zone 42. The data from the token is then copied to the unsealed zone 44.

The child is able to change information or attributes or responses to sociodemographic questions regarding his or herself by changing information in the unsealed zone 44 or adding and/or amending information regarding his or her interests and activities in the preference zone 46. Whenever a child changes the data in the unsealed zone 44 a flag 48 is set. If the flag is set it will mean that the data in the unsealed zone 44 has been changed by the child and consequently it is no longer a 100% true copy of the attribute data in the sealed zone 42.

In one implementation of the disclosure, the child is guided and encouraged to respond to various socio-demographic questions by interacting with an Artificial Intelligence program (not shown) within the device. This interaction could be in a let's Pretend_format where the child is encouraged to take on new personas, live in new places and have new interests thereby learning about perspective taking and the emotions, desires and wants of different types of people, issues arising in different locations and problems arising from different activities. Thus, the child learns general information about the world and its risks and opportunities through pretend play which involves viewing associated video advertisements.

The system may be set up so that after a period of e.g. six months elapsed time the flag 48 is automatically unset and a true copy of the data from the sealed zone 42 re-populates the unsealed zone 44. Additionally, an automated update of the token 32 by the trusted third party 30 (not shown in this Figure) would lead to the unsetting of the flag when the electronic device took a copy of the replaced data in the sealed zone 42 and wrote the replaced copy into the unsealed zone 44.

Following its initial creation, the token 32 may, from time to time, be updated by the trusted third party 30 across the Internet 54 by an automated process. Thus, if the child became a pupil at a particular school or had a birthday the trusted third party 30 could produce a replacement token 32 and upload this via the firewall 70 into the sealed zone 42, whereupon the electronic device would take a copy of the replaced data in the sealed zone 42 and write this replaced copy into the unsealed zone 44.

Suppose the child is female, aged ten years and lives in London; this information is stored in both the sealed 42 and the unsealed 44 zones. Suppose the child alters the data in the unsealed zone 44 to indicate that her sex is male, her age is 25 and that she lives in Coventry. In the preference zone 46 the child indicates an interest in smoking cigarettes and in rugby football.

Figure 3:
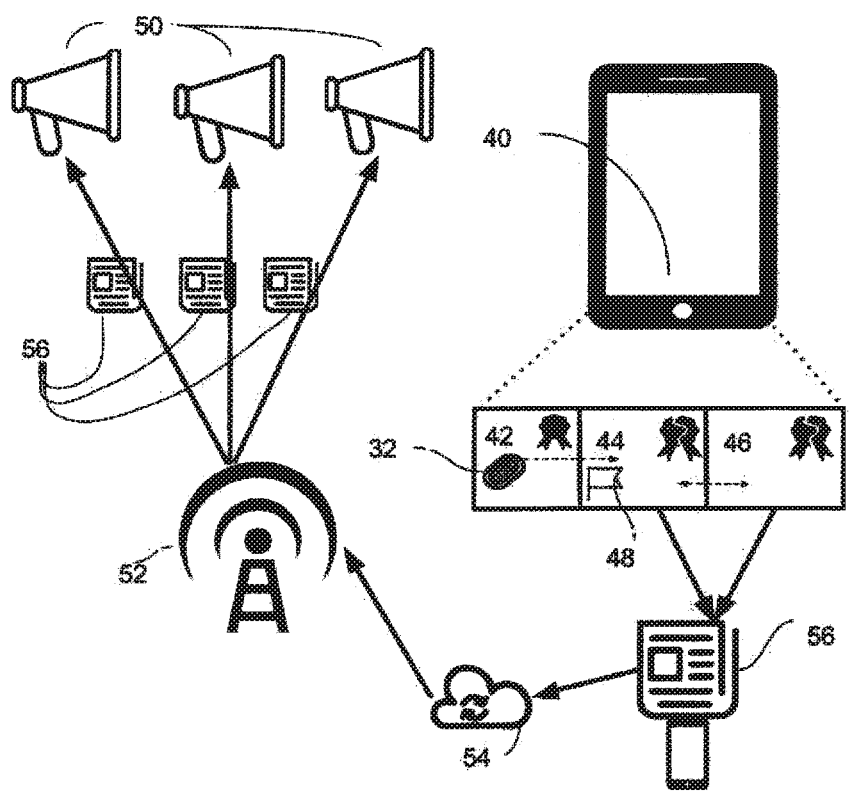
FIG. 3 shows how a broadcaster requests a report from the mobile device which is then sent to several advertisers.

In FIG. 3, a number of advertisers 50 are in two-way communication with a broadcaster 52. Through the internet 54 the broadcaster 52 interrogates the unsealed zone 44 and the preference zone 46 of the mobile device 40 and generates a report 56 which will be referred to as a privacy locker report. This report 56 is sent by the broadcaster 52 to the advertisers 50. In addition to the data in the two zones, the report 56 also indicates whether the flag 48 has been set, in other words, indicating that the data in the report 56 may not be true. Each advertiser 50 uses the report to decide which adverts to send to the device 40 for potential viewing during live or time-shifted programs.

The fact that the flag 48 has been set indicates to the advertisers that the child is making use of the device 40 and has decided to seek information from potential advertisers based upon the profile created in the privacy locker. In other words, the child/viewer has chosen to present an anonymous profile to advertisers so that they can respond to it.

Suppose now that one of the advertisers 50 reads the privacy locker report 56 from the device 40, decides that the report 56 belongs to an appropriate recipient for adverts, and in response sends three adverts: (a) An advert for a brand of shaving soap with a special offer for a shop in Coventry; the advert contains sexual images and is unsuitable for showing to a ten-year-old; the header in the advert indicates its nature, as is conventional; (b) An advert for a rugby match in Coventry. (c) An advert for a Government anti-smoking campaign with a special offer in Coventry.

Each advert has a header which indicates the nature of the advert, as is conventional.

Figure 4:
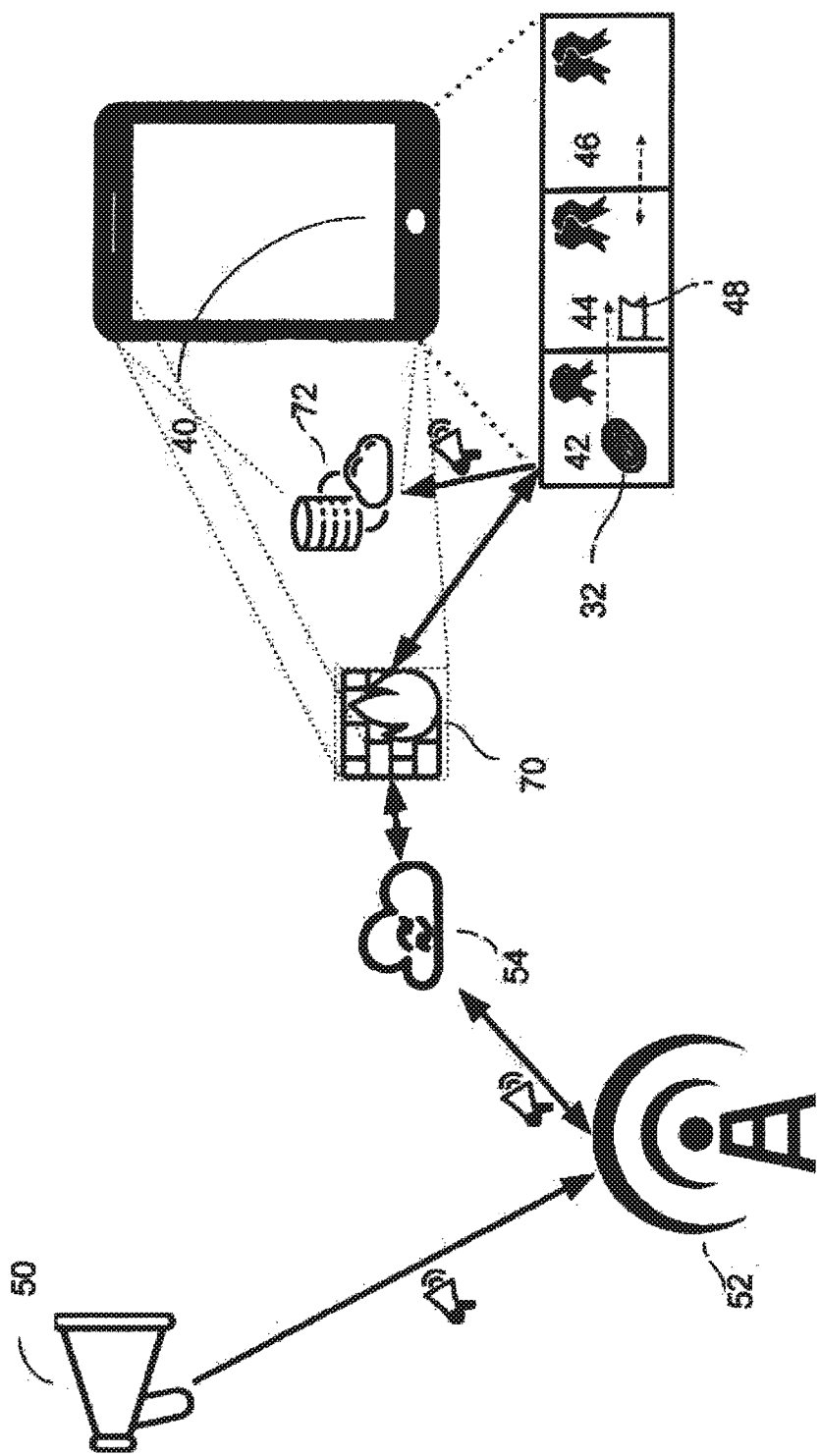
FIG. 4 shows how advertisements from one advertiser are sent to the mobile device.

FIG. 4 shows that these three adverts from the advertiser 50 are sent by the broadcaster 52 to the mobile device 40 via the internet 54 and through the firewall 70 in the device 40. When the three adverts are uploaded, the device 40 is arranged so that the header of each advert is compared to the data in the sealed zone 42, the true age of the child is located, this viewer is recognized as not being an appropriate recipient of the advert with sexual images, and therefore the first advert is rejected. Consequently, the advertiser is not billed by the broadcaster for showing this advert.

The second and third adverts are allowed into the device 40 and are stored for later viewing in a temporary storage area 72.

Figure 5:
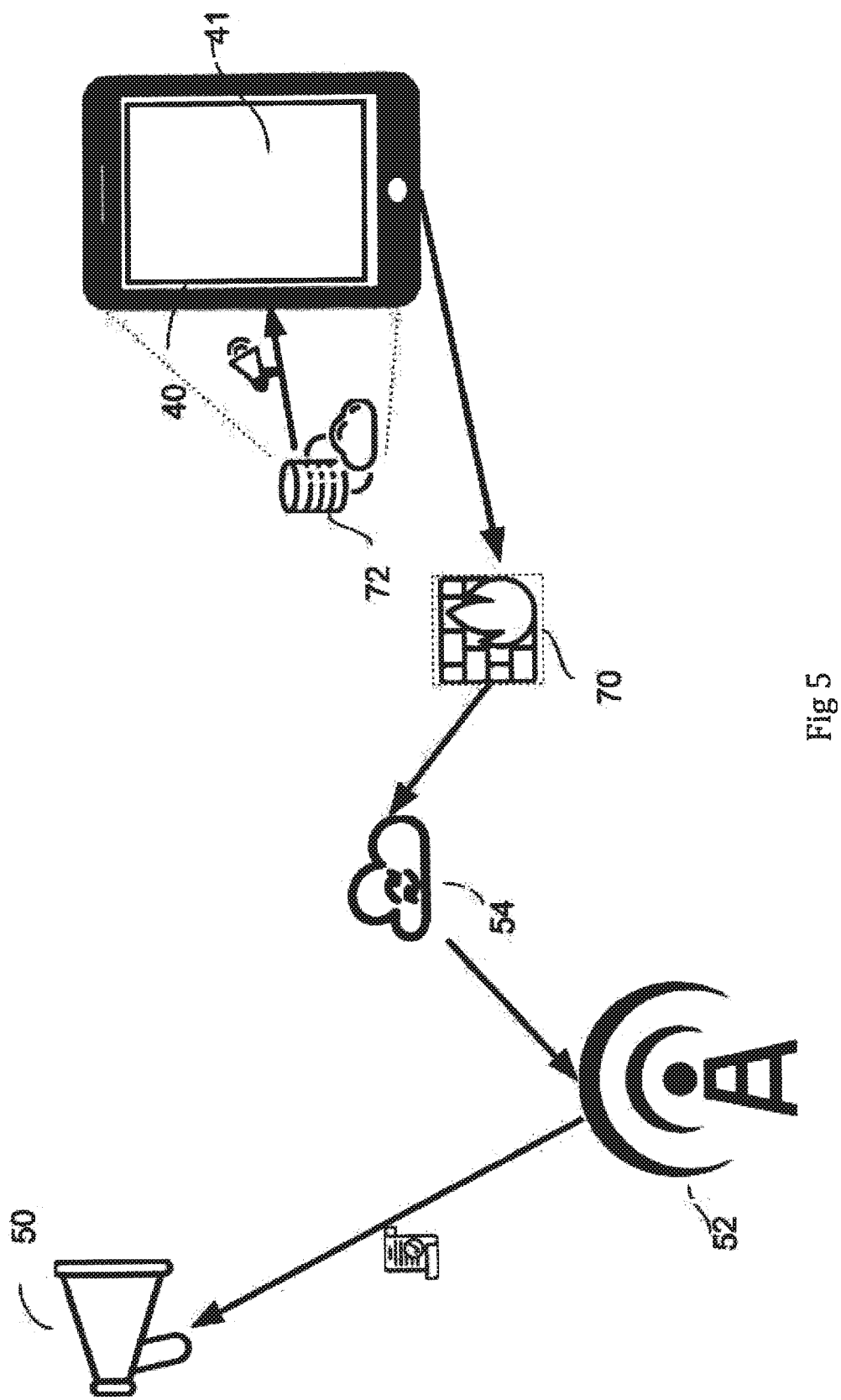
FIG. 5 shows the return path of confirmations that an advertisement has been viewed by the viewer.

Referring now to FIG. 5, during live or time-shifted viewing, both of the supplied adverts are shown on the screen 41 of the device 40 during advertising breaks and a signal is sent from the device 40 through its firewall 70 over the internet 54 to the broadcaster 52 to indicate that they have been shown. The broadcaster can now bill the advertiser 50 for showing the adverts. However, because the flag 48 has been set and the data in the unsealed zone 44 is known to have been altered, a weighting is applied to indicate that a true target viewer may not have been reached. Neither the broadcaster 52 nor the advertiser 50 knows which part of the data in the privacy locker report 56 has been altered.

Figure 6:
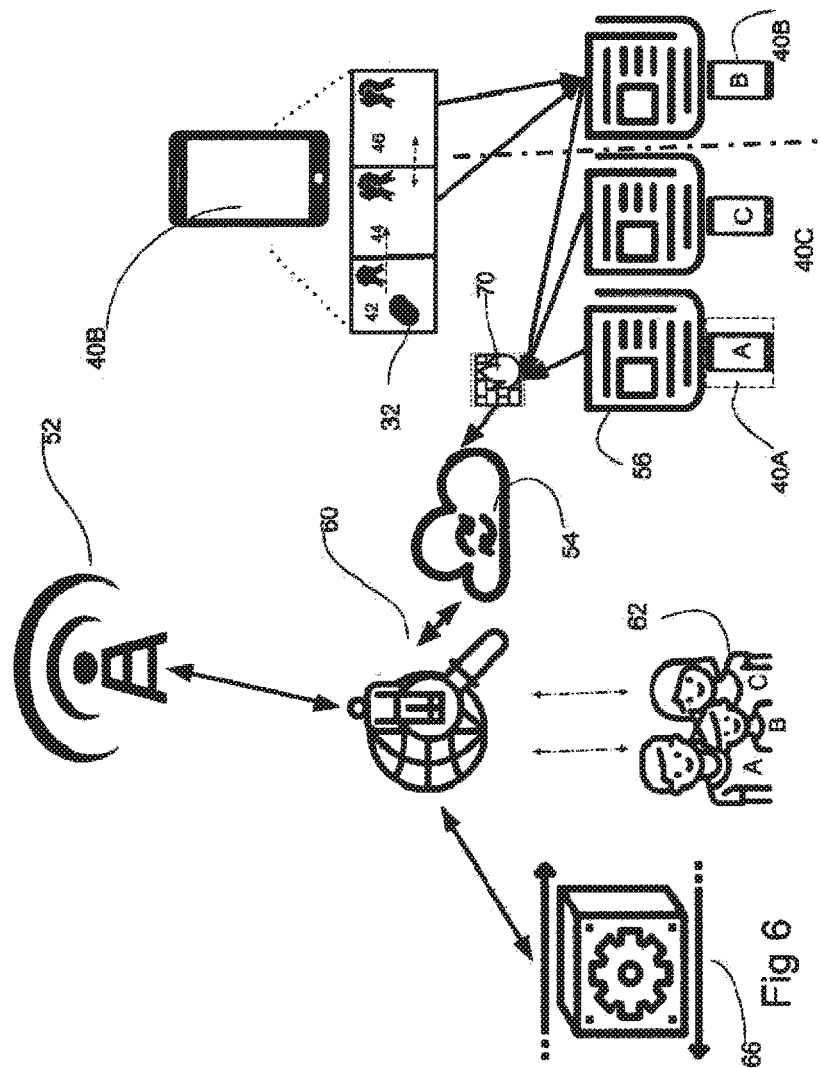
FIG. 6 shows how a market research organization is incorporated in the inventive system to validate the contents of the privacy locker.

This weighting process is shown with reference to FIG. 6. A market research organization 60 solicits permission from a number of groups of people to analyze their viewing habits. When permission is given, the organization examines the privacy locker report of each member of a family 62, and conducts factual confirmation of the truth or otherwise of the data in their privacy lockers, and the true circumstances of the family by face-to-face interviews and telephone interviews. This process is indicated by the broken lines.

Consider a family 62 consisting of two parents 62A, 62C, and a child 62B. The market research organization 60 will receive data from the mobiles 20 40A, B and C of all three family members, but for clarity the Figure shows only data from the mobile 40B of the child. The privacy locker report 56B from device 40B used by the child B is sent, via the firewall 70 and over the Internet 54 to the market research organization 60.

From comparing the privacy locker reports of each member of a family 62 with the true circumstances of the family determined by face-to-face interviews and telephone interviews the market research organization 60 can establish whether a characteristic recorded in the family's privacy lockers is true or not. By researching a large number of families, for example several thousand, the organization 60 establishes a mathematical probability that any given attribute in a privacy locker is true or false. The market research organization 60 tests scenarios against actual results of viewer engagement with video advertisements and uses a Bayesian network 66 to combine combinations of probabilities of attributes; thus, for example it will be able to establish the probability that several desired attributes in a privacy locker are true. The Bayesian network uses Bayes-theorem which relates the conditional and marginal probabilities of events A and B, where B has a non-vanishing probability, the relationship being given by:

$$P(A/B) = \frac{P(B/A)P(A)}{P(B)}$$

Each term in Bayes-theorem has a conventional name:

P(A) is the prior probability or marginal probability of A. It is 'prior' in the sense that it does not take into account any information about B.

P(AB) is the conditional probability of A, given B. It is also called the posterior probability because it is derived from or depends upon the specified value of B.

P(B/A) is the conditional probability of B given A.

P(B) is the prior or marginal probability of B, and acts as a normalizing constant.

Once the organization 60 has established the probability P(AB) it sends this to the broadcaster 52 who can use it to calculate the percentage of the full cost of the rate card to be charged to the advertiser for the showing of the advertisement.

An advertiser 50 is charged by the broadcaster 52 for the viewing of the advert as a percentage of full cost depending on the likelihood of the privacy locker data matching the desired characteristics of the target audience of the advertisement. This weighting is determined by Bayesian analysis performed by the market research organization 60.

In performing the analysis, the market research organization 60 will be able to establish the reasons why a person gives, for example, a false geographical location in their privacy locker. The viewer will then see adverts relating to that location, and the reason might be that they plan to visit the location or have some other connection with that location. This will mean that the advertiser is reaching its target audience by secondary means and the showing of the advertisement to the person supplying the false data may have value to the advertiser in reaching its target audience.

Considering the examples of adverts given above, a child claiming to live in Coventry may have a grandfather who lives there and is interested in rugby so that the advert could lead to an indirect ticket sale to the grandfather either by the grandfather himself or as a present purchased by the child or the child's parent. The claim by the child to be interested in smoking cigarettes may, on seeing the advert, lead to the child telling the grandfather about an anti-smoking campaign near his home. Alternatively, the child may actually smoke cigarettes and may have given a false location because of privacy fears, and a wish not to be stalked by an advertiser or a government agency or an insurer. In addition, a government anti-smoking campaign may have reached an appropriate target who then seeks anti-smoking offers near to home.

The recommended practice of putting incorrect information in the privacy locker means that the information is never to be relied upon as evidence of facts about a specific person. Thus, for example, a statement in a privacy locker that a person smokes *cannabis* is never to be treated as an evidential fact about that person. However, a market research organization polling millions of privacy lockers and performing face-to-face and telephone interviews on thousands of families would be able to provide Government with accurate statistical data on the true level of *cannabis* addiction in society. The sole purposes of privacy lockers are to enable people to maintain anonymous control over their digital footprint while being able to explore topics, products and services which might interest them and be useful to them, to allow advertisers to reach their target audiences without incurring data protection liabilities and duties and to facilitate governments in obtaining reliable statistical information about their populations without data protection vulnerabilities.

Given sufficient statistical research all of the factors set out above may be combined to establish a probability that any advert has reached its target audience.

Embodiments of the disclosure have been described with reference to a child using a mobile device to view time-shifted commercial programs. It can also be applied to digital devices used to view live television, when targeted adverts maybe shown during commercial breaks, and it may be applied to non-mobile digital devices. Embodiments of the disclosure may further be applied to a closed user group in which every member of the group is entitled to make use of a service; such a service could be for example, a viewing channel for high value training resources, restricted to teachers in further education, A member of the group, wishing to find a job in a different geographical area, could amend his/her profile so as to become a target for adverts for jobs in that area; this would not reveal the member's identity.

The invention claimed is:

1. A digital device for viewing free-to-air videos with targeted advertising comprising:
   a video receiver;
   a storage device operative to receive and store targeted adverts having associated headers which indicate the nature of the advert;
   a visual display unit;
   a firewall; and, behind the firewall, a data store having:
      a first, sealed data storage section for storing data relating to personal attributes of the viewer provided by a trusted authority, wherein the device is configured to prevent at least some of the data in the first sealed data storage section from being altered;
      a second, unsealed data storage section to enable the data in the first sealed section to be copied and to enable the copied data to be modified by the viewer;
      a third, preference data storage section to enable the viewer to store data; and
      in the second section an indicator to flag whether the data has been modified;
      arranged so that a stored targeted advert is not to be supplied to the visual display unit when a personal attribute stored in the first, sealed data storage section indicates that the advert is not suitable for the viewer.

2. A digital device according to claim 1 in which the first, sealed data storage section is populated using an encrypted token.

3. A digital device according to claim 1 in which, if the indicator in the second section is set to flag that data therein has been modified, wherein the indicator is to be unset after a predetermined time period.

4. A digital device according to claim 1 arranged to receive and store free-to-air videos for time-shifted viewing.

5. A method of using a digital device according to claim 1 to view targeted adverts comprising:
   a broadcaster interrogating the second and third data storage sections and sending to the device adverts targeted on the stored data, each advert having a header indicating a nature of the advert;
   the digital device comparing each header with the personal attributes stored in the first data storage section and rejecting any unsuitable advert.

6. A digital device according to claim 1, wherein the device is configured to prevent any of the data in the first sealed data storage section from being altered.

7. A digital device according to claim 2 in which the encrypted token is provided by an entrusted third party.

8. A method according to claim 5 in which:
   unrejected adverts are stored in the device;
   adverts are shown on the visual display unit during advertising breaks in a video; and
   a signal is sent to the broadcaster to indicate that an advert has been shown.

9. A method according to claim 8 in which:
   the broadcaster interrogates the second data storage section, and if the indicator is set to flag that data therein has been modified, indicates to the advertiser a possibility that the adverts were not viewed by a correct target viewer.

10. A method according to claim 9 in which a Bayesian network establishes the likelihood that the target viewer was correct.

* * * * *